United States Patent
Marra

(10) Patent No.: US 10,761,648 B2
(45) Date of Patent: Sep. 1, 2020

(54) GAZE DETECTION INTERLOCK FEATURE FOR TOUCH SCREEN DEVICES

(71) Applicant: Michael D. Marra, Commerce Township, MI (US)

(72) Inventor: Michael D. Marra, Commerce Township, MI (US)

(73) Assignee: Michael D. Marra, Commerce Township, MI (US)

( * ) Notice: Subject to any disclaimer, the term of this patent is extended or adjusted under 35 U.S.C. 154(b) by 0 days.

(21) Appl. No.: 16/249,472

(22) Filed: Jan. 16, 2019

(65) Prior Publication Data

US 2020/0225799 A1 Jul. 16, 2020

(51) Int. Cl.
*G06F 3/041* (2006.01)
*G06F 3/01* (2006.01)

(52) U.S. Cl.
CPC ............ *G06F 3/0416* (2013.01); *G06F 3/013* (2013.01)

(58) Field of Classification Search
CPC ................................ G06F 3/0416; G06F 3/013
See application file for complete search history.

(56) References Cited

U.S. PATENT DOCUMENTS

| | | | | |
|---|---|---|---|---|
| 8,913,004 B1* | 12/2014 | Bozarth | ............. | G06K 9/00604 345/156 |
| 9,946,371 B2* | 4/2018 | Keating | ............. | G06F 3/03547 |
| 2006/0022959 A1* | 2/2006 | Geaghan | ............. | G06F 3/0416 345/173 |
| 2015/0035776 A1* | 2/2015 | Yamazaki | ............. | G06F 3/038 345/173 |
| 2015/0338914 A1* | 11/2015 | Andrysco | ............. | G06F 3/041 345/173 |
| 2016/0275314 A1* | 9/2016 | Thorn | ............. | G06F 3/013 |
| 2018/0088665 A1* | 3/2018 | Peterson | ............. | G06F 3/04886 |
| 2019/0187786 A1* | 6/2019 | Agarwal | ............. | G06K 9/3233 |

\* cited by examiner

*Primary Examiner* — Rodney Amadiz
(74) *Attorney, Agent, or Firm* — Shumaker, Loop & Kendrick, LLP; Michael D. Marra

(57) ABSTRACT

A touch screen device and method of controlling the device wherein the device responds to user touch screen inputs only when the device is unlocked and the user's visual gaze is directed at the device screen. The device employs a front-facing camera and gaze detection technology to determine whether the user is looking directly at the device display screen. If the user is not looking at the screen, touch input commands are ignored by the device, even if the device is unlocked, thereby preventing unintended application actions due to incidental screen contact. The gaze detection interlock feature may be enabled or disabled through configuration settings. The gaze detection interlock feature, if enabled, may respond only to the primary device user's face and visual gaze, or may respond when any person's visual gaze is directed to the device screen.

18 Claims, 5 Drawing Sheets

GAZE DETECTION INTERLOCK FEATURE FOR TOUCH SCREEN DEVICES

BACKGROUND

Field

The present disclosure relates generally to a method for controlling user interaction with a touch screen device. More particularly, it relates to a method for controlling user interaction with a touch screen device, such as a smart phone or tablet, where the device, if unlocked, only responds to the user's screen touches when the user is looking at the device screen. The gaze-detection feature prevents unwanted device actions which are commonly encountered when a user is simply trying to handle the device.

Discussion of the Related Art

The capabilities of smart phones and tablet devices have increased dramatically since they were first introduced. Modern designs for almost all such devices now employ a touch screen user interface, where virtually the entire screen surface is used both for graphical display and for receiving user commands via touch. The touch screen interface offers application ("app") designers almost unlimited flexibility in designing apps—from simple apps such as phone dialing and text messaging to complex and graphically-intensive apps such as gaming and virtual reality.

Because they provide access to sensitive personal information and data belonging to the user/owner, smart phones and tablet devices all have a security locking feature, where the device may be configured to lock automatically after a user-defined period of inactivity, and the device can be instantly locked by a user command or button push. When a device is locked, touch screen access to the apps is disabled, and only a very limited subset of touch screen commands are available—such as entering a passcode to unlock the phone, and placing an emergency ("911") phone call.

A common problem with touch screen devices is that, when the device is unlocked, almost any touch of the screen will trigger an action. Even an accidental or inadvertent touch by the user, such as when the user is attempting to set the device down on a desk or a vehicle console, will trigger an unintended action. For example, if the user has just ended a phone call (and the smart phone is unlocked and in the phone app), an accidental screen touch might place an unwanted phone call to someone on the recent call list. As another example, if the user has started navigation using a GPS app, and accidentally touches the screen while setting the phone down, this could cause the map to zoom or pan in an undesired way, change the destination data, or end navigation. These unintended actions at a minimum are frustrating to the user, and may even be distracting and dangerous in the context of a driving situation.

In order to avoid the unintended actions described above, a touch screen device user is forced to either lock the device after using it, or carefully handle the device to avoid touching any part of the display screen. Most users find both of these workarounds to be inconvenient and annoying. Furthermore, locking the device defeats the purpose of using GPS navigation apps and many other apps, and is therefore not a viable workaround.

Facial recognition systems are known to be available on some touch screen devices. These facial recognition systems employ a user-facing or "front-facing" camera (that is, a camera having its lens on the display screen side of the device) to recognize the user based on a previously-defined facial image map, where the facial recognition can be used as a form of security authentication in addition to or in lieu of a passcode. Some existing facial recognition systems also include gaze detection technology which recognizes whether the user's eyes are open and the user's attention (visual gaze) is directed towards the device screen.

In view of the circumstances described above, there is an opportunity to incorporate visual gaze detection into touch screen device operation in order to prevent unintended device actions.

SUMMARY

The present disclosure describes a touch screen device and a method of controlling the device wherein the device responds to user touch screen inputs only when the device is unlocked and the user's visual gaze is directed at the device screen. The device employs a front-facing camera and gaze detection technology to determine whether the user is looking directly at the device display screen. If the user is not looking directly at the display screen, touch input commands are ignored by the device, even if the device is unlocked, thereby preventing unintended application actions due to incidental screen contact. The gaze detection interlock feature may be enabled or disabled through device configuration settings. The gaze detection interlock feature, if enabled, may respond only to the primary device user's face and visual gaze, or may respond when any person's visual gaze is directed to the device display screen.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a touch screen device and a method of controlling the device including a gaze detection interlock feature is merely exemplary in nature, and is in no way intended to limit the disclosure or its applications or uses.

Smart phones, tablet devices and personal computers have become an important part of everyday life. One feature which has made these computing devices so powerful and easy to use is the touch screen display. Virtually all smart phones and tablet devices now include a touch screen display. Many laptop computers, desktop computer monitors, gaming systems and video display devices such as televisions also now include touch screen displays. The gaze detection interlock feature of the present disclosure is particularly applicable to smart phones because of the manner in which smart phones are handled by users. For this reason, the following detailed discussion of the disclosed techniques is based on smart phone usage scenarios. However, it is to be understood that the disclosed techniques are applicable to all of the device types mentioned above, and any other type of touch screen device.

Because they provide access to sensitive personal information, applications ("apps") and data belonging to the user/owner, smart phones and tablet devices have a security locking feature. When a device is locked, touch screen access to the apps is disabled, and only a very limited subset of touch screen commands are available—such as entering a passcode to unlock the device, and placing an emergency ("911") phone call. Phones and tablets typically may be configured to lock automatically after a user-defined period of inactivity, and the devices can be instantly locked by a user command or button push.

A common problem with smart phones is that, when the device is unlocked, almost any touch of the screen will trigger an action. Even an accidental or inadvertent touch by the user, such as when the user is attempting to set the phone down on a desk or a vehicle console, will trigger an unintended action.

Figure 1:
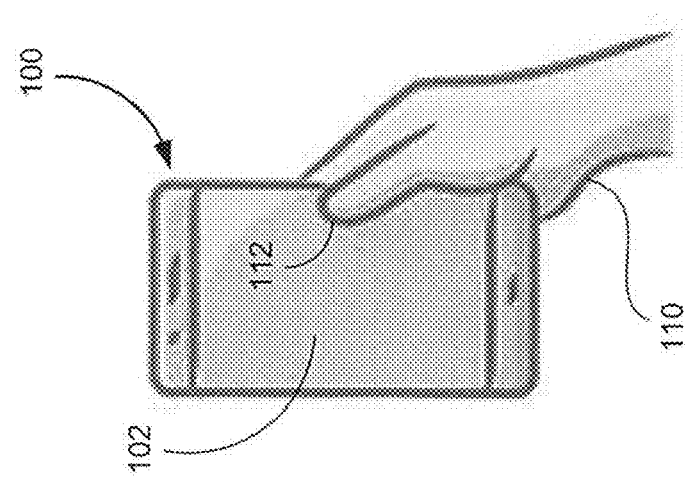
FIG. 1 is an illustration of a smart phone device in a user's hand, where the thumb of the hand is making unintended incidental contact with the touch screen, as known in the art.

FIG. 1 is an illustration of a smart phone 100 in a user's hand 110, where the thumb of the hand 110 is making unintended incidental contact with a touch screen 102. In FIG. 1, the user is holding the smart phone 100 in a manner commonly used after entering information with the thumb (such as typing a text message, placing or ending a phone call, or operating any other app). Unfortunately for users, when holding the smart phone 100 in this manner, and then attempting to set the phone 100 down in a vehicle console or on a desktop or other surface, the thumb can inadvertently contact the touch screen 102 at a location 112. The thumb touch at the location 112 will cause an unintended application action if the smart phone 100 is unlocked.

Figure 2:
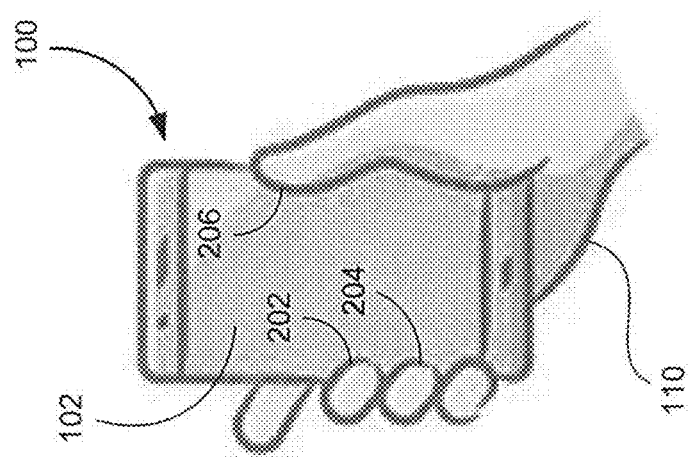
FIG. 2 is an illustration of a smart phone device in a user's hand, where several parts of the hand are making unintended incidental contact with the touch screen, as known in the art.

FIG. 2 is an illustration of the smart phone 100 in the user's hand 110, where the thumb and fingers of the hand 110 are making unintended incidental contact with the touch screen 102. In FIG. 2, the user is holding the smart phone 100 in a manner commonly used for securely gripping any item in the hand 110. Unfortunately, when holding the smart phone 100 in this manner, whether simply carrying the smart phone 100 or attempting to place the phone 100 on a surface or in a pocket or purse, the fingers can inadvertently contact the touch screen 102 at a location 202 or 204, and/or the thumb can inadvertently contact the touch screen 102 at a location 206. A screen touch at any of the locations 202/204/206 will cause an unintended application action if the smart phone 100 is unlocked.

Unintended application actions of the type illustrated in FIGS. 1 and 2 can include launching and executing commands and operations in any application installed on the smart phone 100.

For example, if the user has just ended a phone call (and the smart phone 100 is unlocked and displaying the phone app), an accidental screen touch might place an unwanted phone call to someone on the recent call list. As another example, if the user has started navigation using a GPS app, and accidentally touches the screen 102 while setting the phone 100 down in the vehicle console, this could cause the map to zoom or pan in an undesired way, change the navigation destination data, or end navigation. The possibilities for unintended application actions are endless—including other examples such as accidentally starting music or video streaming, accidentally executing a transaction in a mobile banking app, accidentally making a purchase from a retailer app or website, etc.

These unintended actions, at a minimum, are frustrating to the user. Furthermore, these unintended actions may create costs or consequences for the user (accidental purchase of an item, for example), and may even be distracting and dangerous in the context of a driving situation.

In order to avoid the unintended application actions described above, a smart phone user is forced to either lock the smart phone 100 after using it, or carefully handle the phone 100 to avoid touching any part of the touch screen 102.

Figure 3:
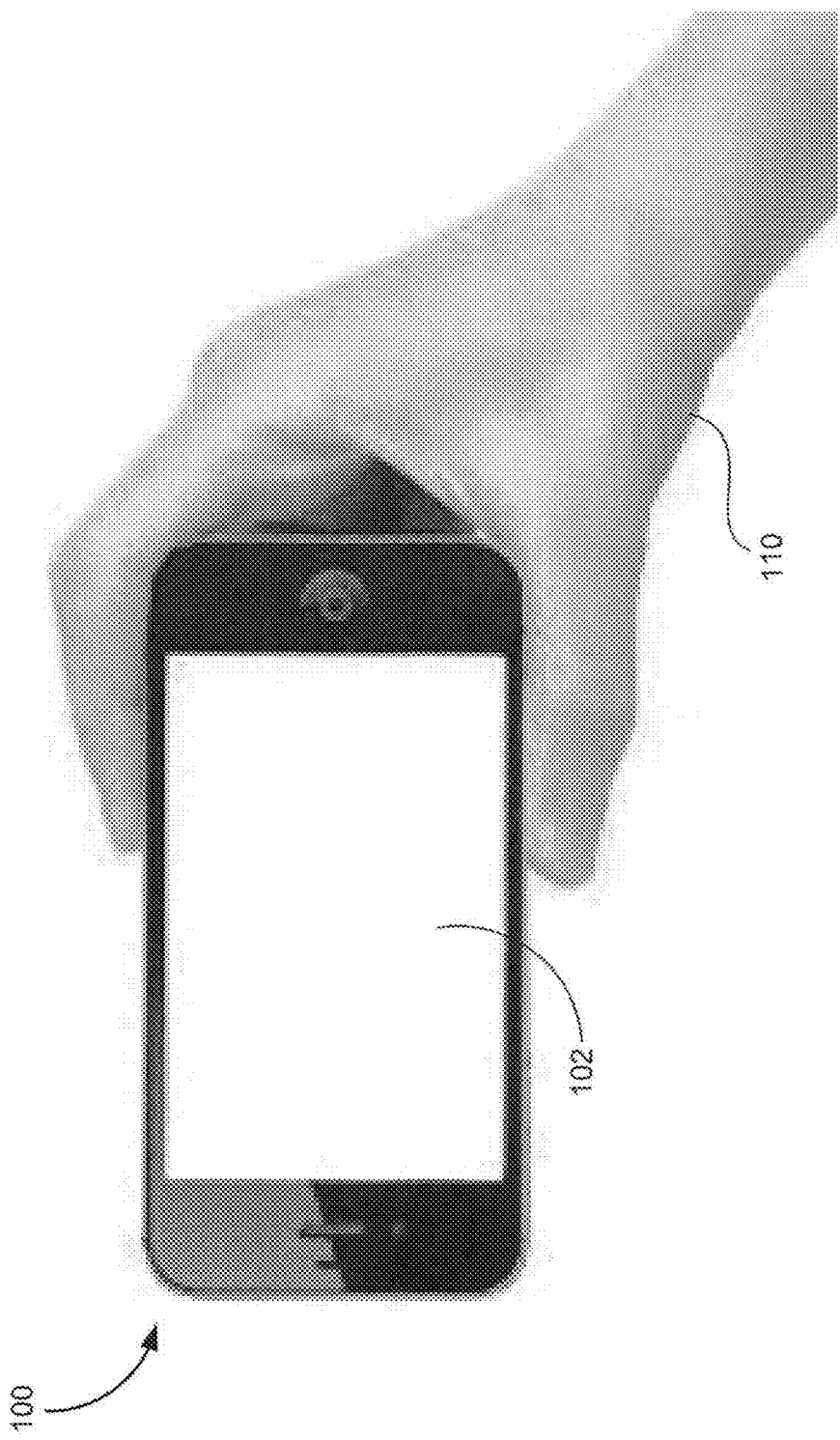
FIG. 3 is an illustration of a smart phone device in a user's hand, where the user is carefully gripping the device around the edge of the case in order to avoid making unintended incidental contact with the touch screen, as known in the art.

FIG. 3 is an illustration of the smart phone 100 in the user's hand 110, where the user is gripping the phone 100 around the edge of the case in order to avoid making incidental contact with the touch screen 102.

Carefully gripping the smart phone 100 in the manner shown in FIG. 3 is one way to avoid the unintended application actions described above. The smart phone 100 can also be held with the hand 110 open and flat, palm facing up, in order to avoid incidental screen contact. Most users find these types of careful gripping techniques to be inconvenient and annoying. Furthermore, grasping the smart phone 100 without touching the screen 102 results in an inherently insecure grip, causing phones to be dropped and often damaged. This problem has given rise to the so-called "pop-socket" device which can be attached to the back of the phone 100.

As mentioned above, locking the smart phone 100 is another way to avoid unintended application actions. However, locking the phone 100 defeats the purpose of using GPS navigation apps and many other apps, and is therefore not a viable workaround in many situations. In fact, none of the workarounds described above actually resolve the real problem, which is that the smart phone 100 actively responds to user touches of the screen 102 when the user does not want it to do so.

According to the following discussion, the present disclosure describes a technique for controlling a smart phone or other touch screen device wherein the device only responds to user touch inputs when the user is looking directly at the touch screen. The disclosed techniques are based on the premise that, if the user wants the touch screen device to respond to touch commands, the user will be looking at the touch screen, and conversely, if the user is not looking at the screen, then the user does not want the touch screen device to respond to touch commands.

Facial recognition systems are known to be available on some touch screen devices. These facial recognition systems employ a user-facing or "front-facing" camera (that is, a camera having its lens on the display screen side of the device) to recognize the user based on a previously-defined facial image map. The facial recognition can be used as a form of security authentication in addition to, or in lieu of, a passcode.

Some existing facial recognition systems also include gaze detection technology which recognizes whether the user's eyes are open and the user's attention (visual gaze) is directed towards the device screen. A typical gaze detection subsystem includes a front-facing camera and possibly other sensors providing images and data to the device's processor which runs an algorithm to determine whether the user is looking directly at the screen. This gaze detection technology can be employed to control the touch screen device operation. The disclosed technique, which might be called a gaze detection interlock feature, causes the touch screen device to respond to user inputs only when the user's visual gaze is directed toward the screen.

Figure 4:
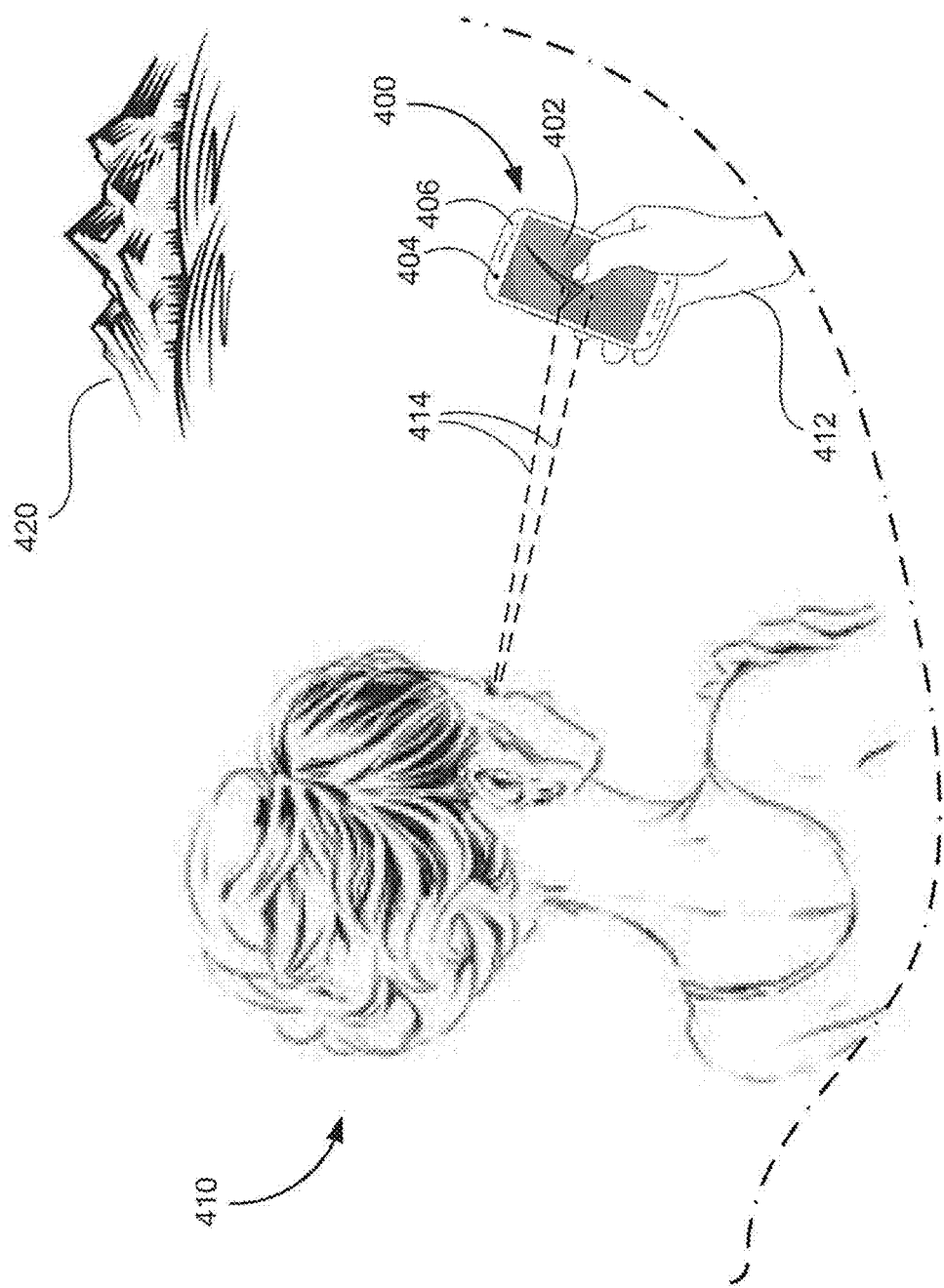
FIG. 4 is an illustration of a smart phone device in a user's hand, where the user's visual gaze is directed at the display screen, causing the device to respond to touch screen inputs, according to an embodiment of the present disclosure.

FIG. 4 is an illustration of a smart phone 400 being held by a user 410, where the user's visual gaze is directed at a display screen 402, causing the smart phone 400 to respond to touch screen inputs, according to an embodiment of the present disclosure. The smart phone 400 employs a front-facing camera 404 and/or other sensors 406 to provide images and/or geometric shape data describing the user's face. The other sensors 406 may include any type of sensor suitable for providing images or shape data of the user's face—including but not limited to another visual-light camera, an infrared camera, an ultrasonic sensor, a LiDAR sensor, etc. The images and/or shape data are processed using known gaze detection technology (for example, the locations of the irises and pupils within the eye outline) to determine whether the user 410 is looking directly at the screen 402.

In FIG. 4, the user 410 is looking directly at the screen 402, as indicated by dashed lines 414. Existing gaze detection technology can easily and reliably determine that the user's gaze is directed to the screen 402 and not, for example, at a distant scene 420. Because the user's gaze is directed to the touch screen 402, the smart phone 400 responds normally to any touch of the screen 402. The smart phone 400 is shown in a hand 412 of the user 410, with the thumb of the hand 412 being used in typical fashion to input touch commands on the screen 402.

Figure 5:
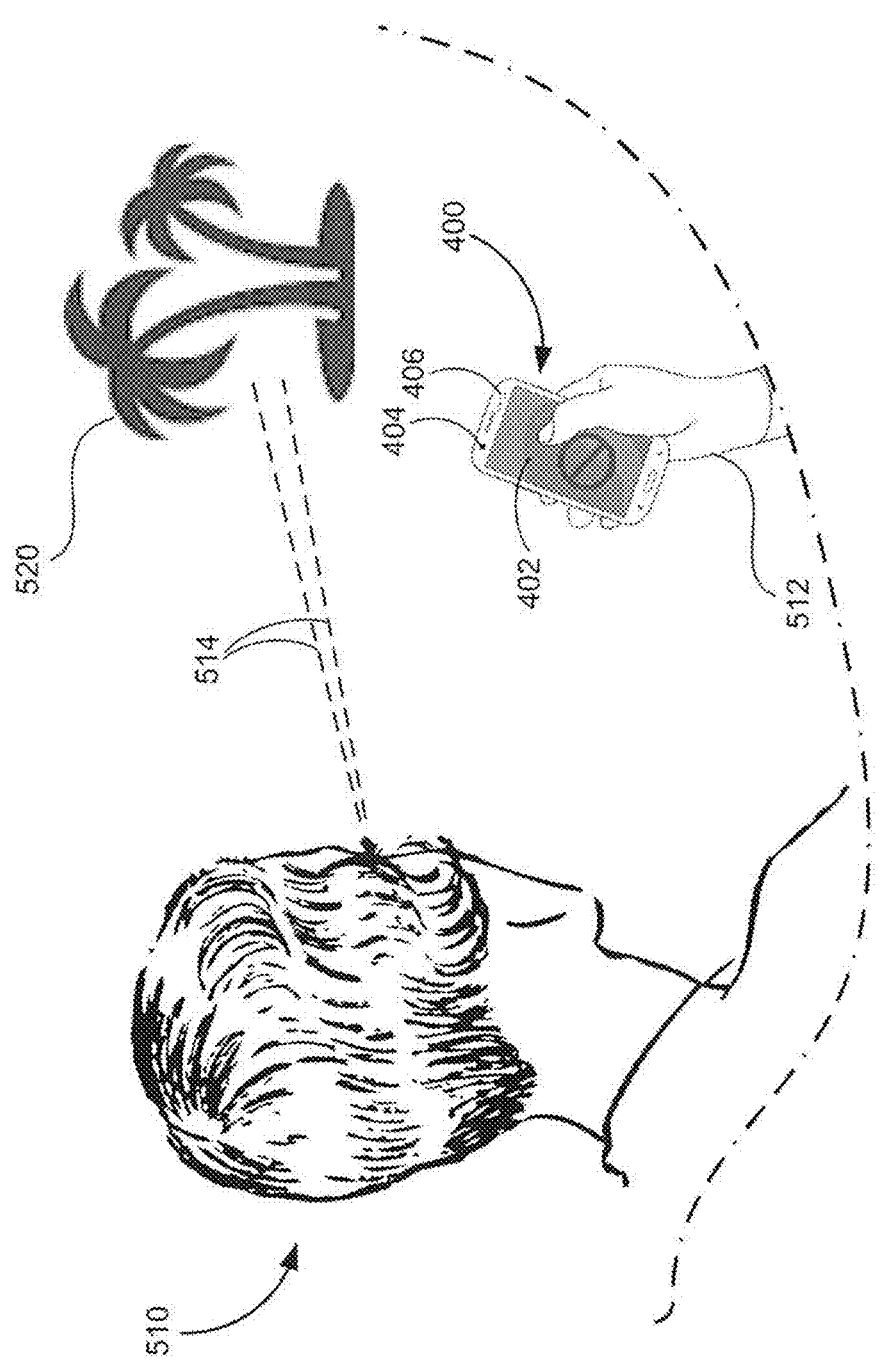
FIG. 5 is an illustration of a smart phone device in a user's hand, where the user's visual gaze is not directed at the display screen, causing the device to ignore touch screen inputs, according to an embodiment of the present disclosure.

FIG. 5 is an illustration of the smart phone 400 being held by a user 510, where the user's visual gaze is not directed at the display screen 402, causing the smart phone 400 to ignore touch screen inputs, according to an embodiment of the present disclosure. In FIG. 5, although holding the phone 400 in a hand 512, the user 510 is looking at a distant scene 520 as indicated by dashed lines 514. The gaze detection subsystem on the smart phone 400 can readily determine that the user's gaze is directed to the distant scene 520 and not at the touch screen 402. Because the user's gaze is not directed to the touch screen 402, the gaze detection interlock feature is activated, meaning that the smart phone 400 ignores any touch of the screen 402, such as by the thumb of the hand 512. As illustrated in FIG. 5, the gaze detection interlock feature causes touch input commands to be ignored by the smart phone 400, even if the 400 is unlocked, thereby preventing unintended application actions due to incidental screen contact.

The gaze detection interlock feature may be enabled or disabled through device configuration settings. That is, in a settings menu on the phone 400, the user may enable the gaze detection interlock feature (causing the phone 400 to behave as described in the discussion of FIGS. 5 and 6), or the user may disable the gaze detection interlock feature (causing the phone 400 to always respond to user touch inputs when the phone 400 is unlocked, regardless of whether the user is looking at the screen). Enabling and disabling the gaze detection interlock feature is also preferably possible via voice command, to make it easy for the device owner to turn the feature on or off in a hands-free manner.

The gaze detection interlock feature, if enabled, may respond only to the primary device user's face and visual gaze, or may respond when any person's visual gaze is directed to the device display screen. Responding only to the primary device user's face and visual gaze (as determined by the facial recognition security feature discussed earlier) may be advantageous, for example, if the user wants to ensure that he or she is the only person who can control the device for security reasons. Responding when any person's visual gaze is directed to the device display screen may be advantageous, for example, when a vehicle driver wants to hand the phone to a passenger to enter a navigation destination. These options can also be defined via device configuration settings, either temporary or permanent.

Figure 6:
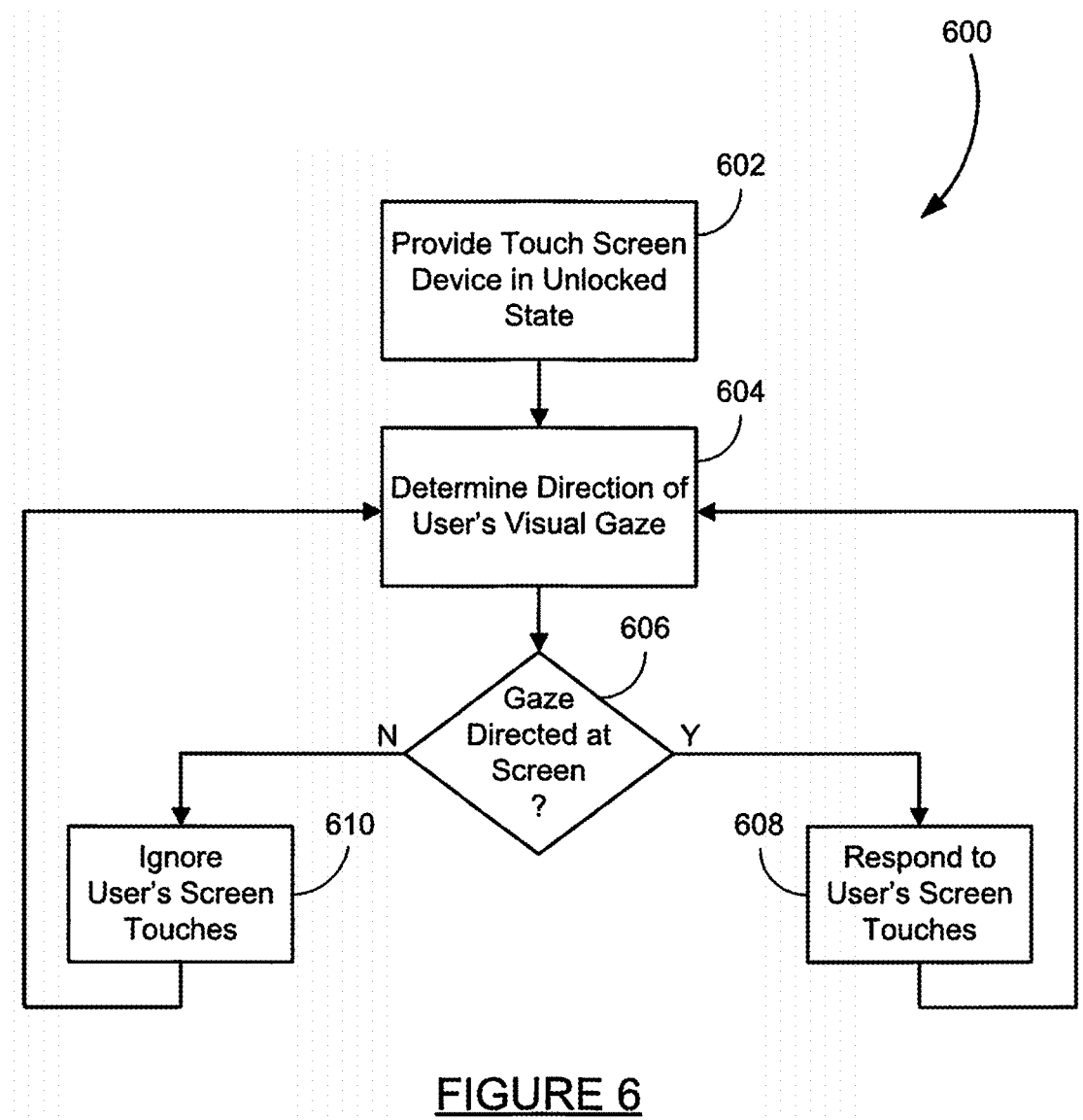
FIG. 6 is a flowchart diagram of a method for controlling user interaction with the touch screen device of FIGS. 4 and 5, according to an embodiment of the present disclosure.

FIG. 6 is a flowchart diagram 600 of a method for controlling user interaction with a touch screen device such as the smart phone 400 of FIGS. 4 and 5, according to an embodiment of the present disclosure. At box 602, a touch screen device (such as the smart phone 400) in an unlocked state is provided. At box 604, the touch screen device determines the direction of the user's visual gaze. This is done using the gaze detection subsystem discussed earlier, including at least one camera communicating with the device processor. At decision diamond 606, it is determined whether the user's visual gaze is directed at the device screen. If the user's visual gaze is directed at the device screen, then at box 608 the touch screen device responds to user screen touches in a normal fashion. If the user's visual gaze is not directed at the device screen, then at box 610 the touch screen device ignores user screen touches, even if the device is unlocked.

The determination of the direction of the user's gaze must be repeated periodically on an ongoing basis by the touch screen device, because the user may be looking at the device screen in one moment, and not looking at the device screen in the next moment, or vice versa. Thus, from both the box 608 and the box 610, the process loops back to the box 604 to once again determine the direction of the user's gaze. The re-determination of the direction of the user's gaze may be performed at regular time intervals, such as every one-tenth of a second or every one second, or based on other criteria or operating system considerations.

The gaze detection interlock feature provides advantages not found in prior art systems. For example, existing facial recognition systems are used only to unlock a device, and do not consider whether the user's gaze is directed to the screen after the device is unlocked. Also, existing eye tracking applications may be used to control a device in lieu of actual touch commands, but do not provide the interlock feature of the present disclosure.

As will be well understood by those skilled in the art, the several and various features and process steps discussed herein to describe the disclosed methods may be referring to operations performed by a computer, a processor or other electronic calculating device that manipulates and/or transforms data using electrical phenomenon. In particular, this refers to the processor or processors in the smart phone 400, said processors performing calculations as part of the gaze detection subsystem, running a device operating system and executing applications, and also controlling touch screen operation via the disclosed gaze detection interlock feature. Those processors and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The disclosed gaze detection interlock feature for controlling user interaction with a touch screen device provides a way to prevent unintended application actions, thereby reducing user frustration and increasing user satisfaction with electronic devices. The disclosed techniques are implementable without adding any new hardware or cost to modern multi-camera touch screen devices.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for controlling a touch screen device, said method comprising: providing the device having a display screen responsive to touch inputs by a user, at least one front-facing camera configured to detect a gaze direction of the user's eyes, and a processor with memory; unlocking the device, by the user, to enable interaction with one or more application programs executable by the processor; determining, by the processor analyzing images from the camera, whether the user's gaze is directed toward the display screen; responding to the touch inputs to perform application operations, by the processor, when the device is unlocked and the user's gaze is directed toward the display screen; and ignoring the touch inputs on the display screen, by the processor, when the user's gaze is not directed toward the display screen; wherein the processor is configured to recognize a difference between a primary user of the touch screen device and another user of the touch screen device, and is configurable to use the difference in responding to the touch inputs or ignoring the touch inputs; wherein the processor is configurable by the primary user to either; respond to the touch inputs only when the primary user's gaze is directed toward the display screen, or respond to the touch inputs when the primary user's gaze or another user's gaze is directed toward the display screen.

2. The method according to claim 1 wherein, in determining whether the user's gaze is directed toward the display screen, the processor also uses images or data from one or more of second camera or a front-facing sensor.

3. The method according to claim 2 wherein the front-facing sensor includes an infrared sensor, an ultrasound sensor or a LiDAR sensor.

4. The method according to claim 1 wherein the touch screen device is a smart phone, a tablet device or a laptop computer.

5. A method for controlling a touch screen device, said method comprising: providing the device having a display screen responsive to touch inputs by a user, at least one front-facing camera configured to detect a gaze direction of the user's eyes, and a processor with memory; unlocking the device, by the user, to enable interaction with one or more application programs executable by the processor; determining, by the processor analyzing images from the camera, whether the user's gaze is directed toward the display screen; responding to the touch inputs to perform application operations, by the processor, when the device is unlocked and the user's gaze is directed toward the display screen; and ignoring the touch inputs on the display screen, by the processor when a gaze detection interlock feature is enabled, when the user's gaze is not directed toward the display screen; wherein the gaze detection interlock feature is configured to recognize a difference between a primary user of the touch screen device and another user of the touch screen device, and is configurable to use the difference in responding to the touch inputs or ignoring the touch inputs; wherein the gaze detection interlock feature is configurable by the primary user to either; respond to the touch inputs only when the primary user's gaze is directed toward the display screen, or respond to the touch inputs when the primary user's gaze or another user's gaze is directed toward the display screen.

6. The method according to claim 5 wherein, in determining whether the user's gaze is directed toward the display screen, the processor also uses images or data from one or more of second front-facing camera or a front-facing sensor.

7. The method according to claim 6 wherein the front-facing sensor includes an infrared sensor, an ultrasound sensor or a LiDAR sensor.

8. The method according to claim 5 wherein the gaze detection interlock feature is enabled or disabled by the user via a configuration setting of the touch screen device, including a configuration setting which is controllable via voice command.

9. The method according to claim 5 wherein the gaze detection interlock feature is configured to also ignore the touch inputs on the display screen when another user's gaze is directed toward the display screen.

10. The method according to claim 5 wherein the gaze detection interlock feature is configured to ignore the touch inputs on the display screen only when neither the primary user's gaze nor another user's gaze is directed toward the display screen.

11. The method according to claim 5 wherein determining whether the user's gaze is directed toward the display screen is repeated periodically when the touch screen device is unlocked.

12. The method according to claim 5 wherein the touch screen device is a smart phone, a tablet device or a laptop computer.

13. An electronic device comprising: a display screen responsive to touch inputs by a user; a front-facing camera or sensor configured to detect a gaze direction of the user's eyes; and a processor with memory, said processor being in communication with the camera or sensor and receiving the touch inputs from the display screen, where the memory contains one or more application programs for execution by the processor, and where the processor is configured to execute from the memory a gaze detection interlock algorithm performing steps of; determining whether the user's gaze is directed toward the display screen based on images or data from the camera or sensor, responding to the touch inputs to perform application operations when the device is unlocked and the user's gaze is directed toward the display screen, and ignoring the touch inputs when the user's gaze is not directed toward the display screen, where the gaze detection interlock algorithm is configured to recognize an identity of a primary user of the touch screen device versus another user of the touch screen device, and the identity is usable by the algorithm in determining whether to respond to the touch inputs or ignore the touch inputs; wherein the gaze detection interlock algorithm is configurable by the primary user to either; respond to the touch inputs only when the primary user's gaze is directed toward the display screen, or respond to the touch inputs when the primary user's gaze or another user's gaze is directed toward the display screen.

14. The device according to claim 13 further comprising an additional front-facing camera or sensor, wherein the processor also uses images or data from the additional front-facing camera or sensor in determining whether the user's gaze is directed toward the display screen.

15. The device according to claim 14 wherein the additional front-facing camera or sensor includes a visual image camera, an infrared sensor, an ultrasound sensor or a LiDAR sensor.

16. The device according to claim 13 wherein the gaze detection interlock algorithm is enabled or disabled by the user via a configuration setting of the touch screen device, including a configuration setting which is controllable via voice command.

17. The device according to claim 13 wherein determining whether the user's gaze is directed toward the display screen is repeated periodically when the touch screen device is unlocked.

18. The device according to claim 13 wherein the touch screen device is a smart phone, a tablet device or a laptop computer.

* * * * *